(12) United States Patent
Stratton (10) Patent No.: US 10,860,098 B1
(45) Date of Patent: Dec. 8, 2020

(54) GESTURE-BASED EYE TRACKING (71) Applicant: HULU, LLC., Santa Monica, CA (US)

(72) Inventor: Josh Stratton, Issaquah, WA (US)

(73) Assignee: HULU, LLC, Santa Monica, CA (US)

(*) Notice: Subject to any disclaimer, the term of this patent is extended or adjusted under 35 U.S.C. 154(b) by 0 days.

(21) Appl. No.: 16/730,997

(22) Filed: Dec. 30, 2019

(51) Int. Cl.
| | |
|---|---|
| G06F 3/01 | (2006.01) |
| G02B 27/00 | (2006.01) |
| G06K 9/00 | (2006.01) |
| G02B 27/01 | (2006.01) |

(52) U.S. Cl.
CPC ......... G06F 3/013 (2013.01); G02B 27/0093 (2013.01); G06F 3/017 (2013.01); G06K 9/00335 (2013.01); G06K 9/00355 (2013.01); G02B 2027/0187 (2013.01)

(58) Field of Classification Search
CPC ................. G06F 3/13; G02B 27/0093; G02B 2027/0187; G06K 9/00335
See application file for complete search history.

(56) References Cited

U.S. PATENT DOCUMENTS

| | | | |
|---|---|---|---|
| 9,119,570 B2* | 9/2015 | Liu | G06T 7/73 |
| 9,729,783 B2* | 8/2017 | Lin | G06K 9/0061 |
| 9,746,915 B1 | 8/2017 | Raffle et al. | |
| 9,798,383 B2* | 10/2017 | Horesh | G06T 7/246 |
| 10,380,441 B2* | 8/2019 | Bieg | B60W 40/08 |
| 10,409,366 B2* | 9/2019 | Beri | G06F 3/0482 |
| 10,509,975 B2* | 12/2019 | Bieg | G06K 9/00597 |
| 10,534,957 B2* | 1/2020 | Chen | G06K 9/00248 |
| 10,642,353 B2* | 5/2020 | Picard | G06F 3/013 |
| 10,650,234 B2* | 5/2020 | Chen | G06K 9/0061 |
| 2006/0281969 A1 | 12/2006 | Wang et al. | |
| 2007/0192722 A1 | 8/2007 | Kokubo | |
| 2016/0085299 A1* | 3/2016 | Horesh | G06F 3/013 345/156 |
| 2016/0203359 A1 | 7/2016 | von und zu Liechtenstein | |

(Continued)

FOREIGN PATENT DOCUMENTS

| | | |
|---|---|---|
| CN | 103412643 A | 11/2013 |
| CN | 107092872 A | 8/2017 |

(Continued)

OTHER PUBLICATIONS

Syed Muhammad Tahir Saleem et al., "Imouse: Eyes Gesture Control System" Source: Published in: (IJACSA) International Journal of Advanced Computer Science and Applications 9(9): 543-554. Publication Date: Jan. 1, 2018 DOI: 10.14569/IJACSA.2018.090968.

(Continued)

*Primary Examiner* — Gene W Lee
(74) *Attorney, Agent, or Firm* — Fountainhead Law Group, PC (57) ABSTRACT

In some embodiments, a method receives images of eyes of a user. The method computes a vertical resting position of the eyes and computes a horizontal resting position of the eyes based on an average horizontal position of both of the eyes. An image of the eyes of the user is received. Then, the method calculates when an offset for a direction and a magnitude of the eyes is within a region in a plurality of regions and determines a command for the region. A call for the command is generated to a device to cause the command to be performed on a user interface.

20 Claims, 9 Drawing Sheets

(56) References Cited

U.S. PATENT DOCUMENTS

| | | | |
|---|---|---|---|
| 2017/0075421 A1 | 3/2017 | Na et al. | |
| 2017/0109580 A1 | 4/2017 | Kaehler et al. | |
| 2017/0243052 A1* | 8/2017 | Sugama | G06K 9/52 |
| 2018/0253143 A1* | 9/2018 | Saleem | G09G 5/003 |
| 2018/0299953 A1 | 10/2018 | Selker et al. | |
| 2019/0025911 A1* | 1/2019 | Picard | G06F 3/0481 |
| 2019/0083335 A1 | 3/2019 | Zhang et al. | |
| 2019/0108395 A1 | 4/2019 | Huang et al. | |
| 2020/0033599 A1* | 1/2020 | Zhou | G02B 27/0101 |
| 2020/0064914 A1* | 2/2020 | Rucci | G06F 3/013 |
| 2020/0149864 A1* | 5/2020 | Kinrot | A61B 3/00 |

FOREIGN PATENT DOCUMENTS

| | | |
|---|---|---|
| CN | 107831900 A | 3/2018 |
| CN | 108595008 A | 9/2018 |
| KR | 20150032019 A | 3/2015 |
| WO | 2008069158 A1 | 6/2008 |
| WO | 2016142933 A1 | 9/2016 |
| WO | 2018184246 A1 | 10/2018 |

OTHER PUBLICATIONS

Piotr Kowalczy, et al., "Blink and Wink Detection as a Control Tool in Multimodal Interaction", Source: Published in: Multimedia Tools and Applications 78(10): 13749-13765. Publication Date: Aug. 25, 2018 DOI: 10.1007/s11042-018-6554-8.
N.M. Mohd Hassan, "Detection of Eye Movements for Controlling a Television". Publication Date: Mar. 7, 2014 DOI: 10.1109/CSPA.2014.6805760.
Fabian Timm, https://github.com/trishume/eyeLik, downloaded Feb. 5, 2020.

* cited by examiner

GESTURE-BASED EYE TRACKING

BACKGROUND

An eye-based user interface may provide functionality that allows a user to interact with the user interface using eye movements. Using eye movements may be useful to users that may not be able to interact with the user interface using non-eye-based methods. Alternatively, using eye movements may be faster for the user to provide commands to the user interface. Some solutions use a gaze-based tracking method where the focus of the user is determined based on tracking of the pupils of the user's eyes or the head movement to predict where the user is looking on the user interface. These models require high error tolerance due to lack of precision in determining where the user is looking and often require significant changes to the user interface to accommodate the imprecise control of an entity on the user interface. For example, it may be hard for a user to move a cursor to select a button using their gaze. To provide error tolerance, the user interface may have to make the selectable buttons larger. Even with the larger buttons, it still may be hard and time consuming for a user to control the user interface using their gaze due to the imprecise nature of the control, which may lead to user frustration.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for an eye gesture system. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

A system uses gestures from a user to determine commands to send to a user interface. The gestures may include eye movements, such as when a user moves the user's eyes (e.g., pupils) in a certain direction. A system may determine when a user performs an eye gesture based on the movement of the user's pupils. Then, based on a region in which the pupils were moved, the system maps the gesture to one or more commands.

To perform the mapping of eye gestures to commands, a system establishes a resting position for the eyes. The system may determine the resting position based on features of the eyes, such as the position of the pupils, but other features of the eyes may be used including the entire eye or other facial features. The system uses the resting position as the basis for determining when gestures are performed. The resting position may include a horizontal resting position and a vertical resting position. To generate the resting position, the system may generate eye boxes that surround the eyes of the user. The horizontal position and the vertical position of both pupils may be determined based on the eye boxes. In some embodiments, the system uses a horizontal resting position that may be based on an average of the horizontal position of the two pupils of the eyes of the user in the eye boxes. This may result in a horizontal resting position between the two eye boxes. The vertical resting position may be based on a ratio of a vertical position within the eye boxes.

When determining whether a gesture is performed, the system determines an active position of the user's pupils based on the horizontal position and the vertical position of the pupils, such as using the average horizontal position and the average vertical position of both pupils. The system may use a direction and a magnitude offset from the resting position to determine the different eye gestures. If four regions around the resting position are used, when an active position enters one of the regions, the system interprets this movement of the user's pupils as a directional gesture.

System Overview

Figure 1:
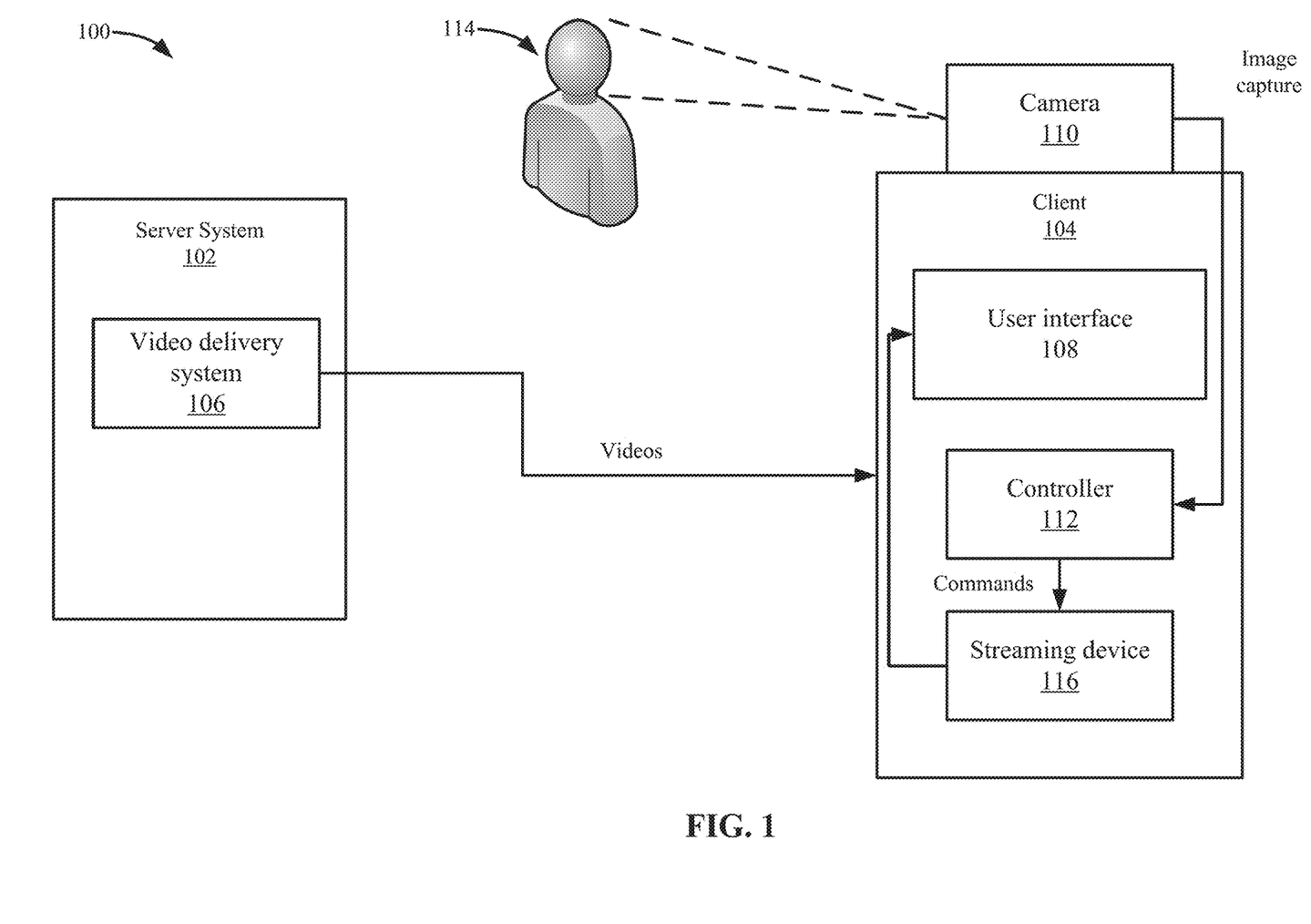
FIG. 1 depicts a simplified system for mapping eye gestures to commands according to some embodiments.

FIG. 1 depicts a simplified system 100 for mapping eye gestures to commands according to some embodiments. System 100 includes a server system 102 and a client 104. Server system 102 may include a video delivery system 106 that may deliver videos to client 104, which can be played on an interface 108. For example, user interface 108 may include a media player that plays a video. User interface 108 may also include an interface that may be controlled by a user 114. For example, user interface 108 allows a user to browse different videos that are offered by video delivery system 106 and also control videos being played. Although videos being browsed are described, other content may be displayed on user interface 108. In some embodiments, an application may be running on client 104, and an interface for the application is displayed on user interface 108.

A remote control can be used to provide commands to the application. The remote control may be a physical remote control or virtual remote control on a device, such as a mobile phone. The remote control may have different buttons that can perform corresponding commands, such as a six-button remote experience that includes four directional buttons of up, down, left, and right and two operational buttons of okay and back. Other commands may also be appreciated.

The application may be accessed via a streaming device 116. Streaming device 116 may be connected to client 104 or integrated within client 104. For example, streaming device 116 may be a device, such as a streaming stick, gaming console, set-top-box, etc. In some embodiments, streaming device 116 may be connected to a peripheral port of client 104. Also, streaming device 116 may be running on client 104. In other examples, streaming device 116 may not be used. When streaming device 116 is discussed, it will be understood that commands may be sent to other devices, such as directed to client 104. For example, client 104 may be natively running the application.

Streaming device 116 may allow a user 114 to select the application for video delivery system 106, which is then displayed on user interface 108. User 114 can then provide commands to user interface 108 using the remote control, such as the remote control for streaming device 116 may allow user 114 to provide commands to user interface 108. In some examples, user 114 may use controls on the remote control to control a selector on user interface 108. User 114 may navigate the selector to different portions of user interface 108 and select various selectable entities, such as videos that are offered on user interface 108.

A camera 110 may capture images of user 114, such as images that include the user's face. In some embodiments, camera 110 may capture video of user 114. Camera 110 may be a camera that is separate from client 104 or may be built into client 104. In some embodiments, camera 110 may be a web camera (e.g., webcam) that is connected to client 104. In other embodiments, camera 110 may be a camera that is integrated into the chassis of client 104. In further embodiments, camera 110 may be associated with a device of user 114, such as a mobile device and not be connected physically to client 104.

Camera 110 may provide images of user 114 (e.g., video) to a controller 112. Controller 112 may be located in different locations, such as within camera 110 (e.g., within the webcam or a mobile device). Also, controller 112 may be located inside client 104, streaming device 116, or in any other device.

Controller 112 may analyze the images, such as the images of the video, to determine when gestures are performed by user 114. Controller 112 may be running in any device that can communicate with camera 110. As shown, controller 112 is in client 104, but may be running in a separate device, such as streaming device 112, a game console, a mobile device, etc. When controller 112 determines that a gesture is performed by user 114, controller 112 maps the gesture to a command. Controller 112 then provides the command to streaming device 116. Once receiving the command, streaming device 116 may perform the command on user interface 108. For example, streaming device 116 may perform the command on the application being displayed on user interface 108, such as if an Up direction is selected, streaming device 116 moves the selector in the up direction. Although streaming device 116 is described, controller 112 may provide the command to other devices. For example, controller 112 may send the command to client 104, and client 104 performs the command on the application directly without involving streaming device 116.

Process Overview

Figure 2:
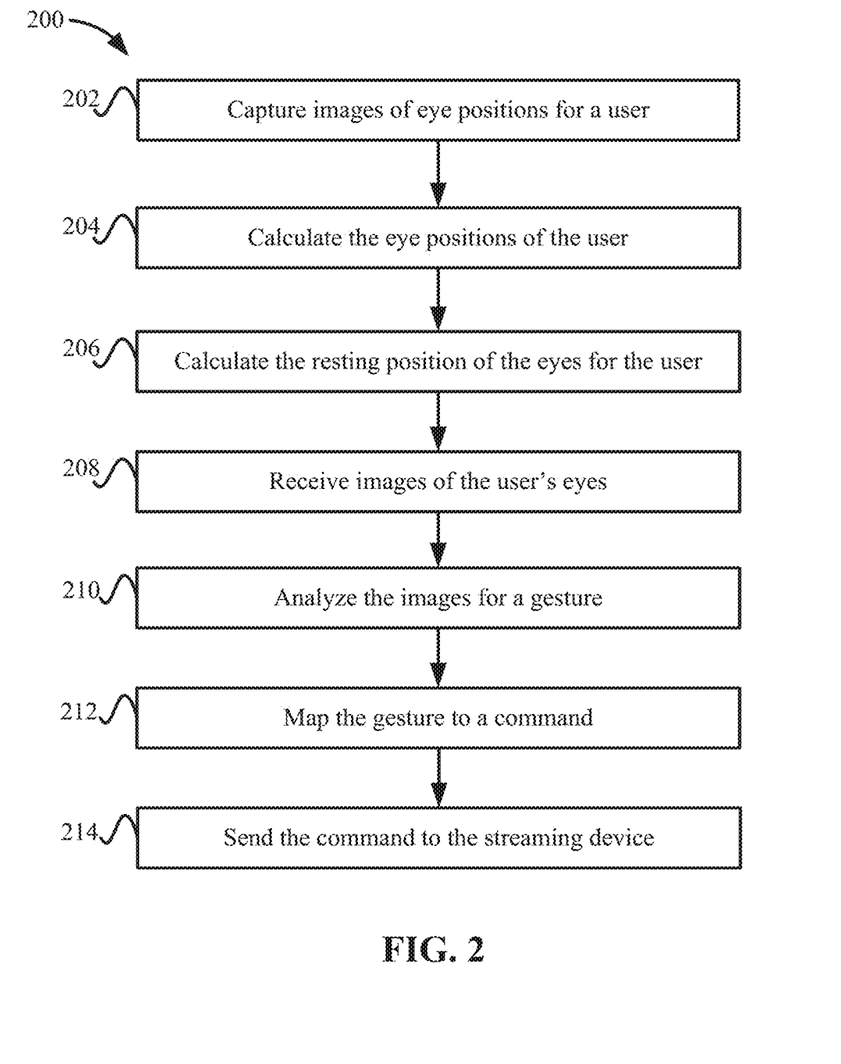
FIG. 2 depicts a simplified flowchart of an overview of the process for mapping gestures to commands according to some embodiments.

FIG. 2 depicts a simplified flowchart 200 of an overview of the process for mapping gestures to commands according to some embodiments. At 202, camera 110 captures images of user 114. The images may be captured from video. At 204, controller 112 calculates eye positions of user 114. For example, the eye positions may be detected via various detection algorithms and may use eye boxes to calculate the eye positions, which will be discussed in more below.

At 206, controller 112 calculates the resting position of the eyes for user 114. For example, a process, which will be described in more detail below, is used to determine the position of the user's pupils of the eyes when the user is at rest. That is, at rest may be when user 114 is not making a gesture and may not be trying to move the user's eyes in any direction.

After calculating the resting position, controller 112 can determine if any eye gestures are performed. For example, at 208, controller 112 receives images of the user's eyes. In some embodiments, controller 112 may analyze each frame of a video. Then, at 210, controller 112 analyzes the images for a gesture. The analysis may be based on an offset of an active position of the user's eyes from the resting position of the eyes. This process will be described in more detail below.

When a gesture is determined, at 212, controller 112 maps the gesture to a command. For example, one eye gesture in the up direction may be mapped to an up navigation command that is being selected on the remote control. As discussed above, the command may be associated with a remote control command, but other commands may be appreciated. For example, the command may be a scrolling command or other command that moves an entity in a direction continuously.

At 214, controller 112 sends the command to streaming device 116. For example, an application programming interface (API) may be used to send the command to streaming device 116. In some embodiments, controller 112 may send the command via a call to the API, which then sends the command to streaming device 116. Various methods for sending the command to streaming device 116 may be appreciated. For example, streaming device 116 may include an interface, such as a HyperText Transfer Protocol (HTTP) interface, that allows remote commands to be sent to streaming device 116 over a network, such as an Internet Protocol (IP) network. That is, controller 112 may not send the command internal to client 104 to streaming device 116.

The following will now describe the resting position calculation and the gesture calculation in more detail.

Resting Position Calculation

Figure 3:
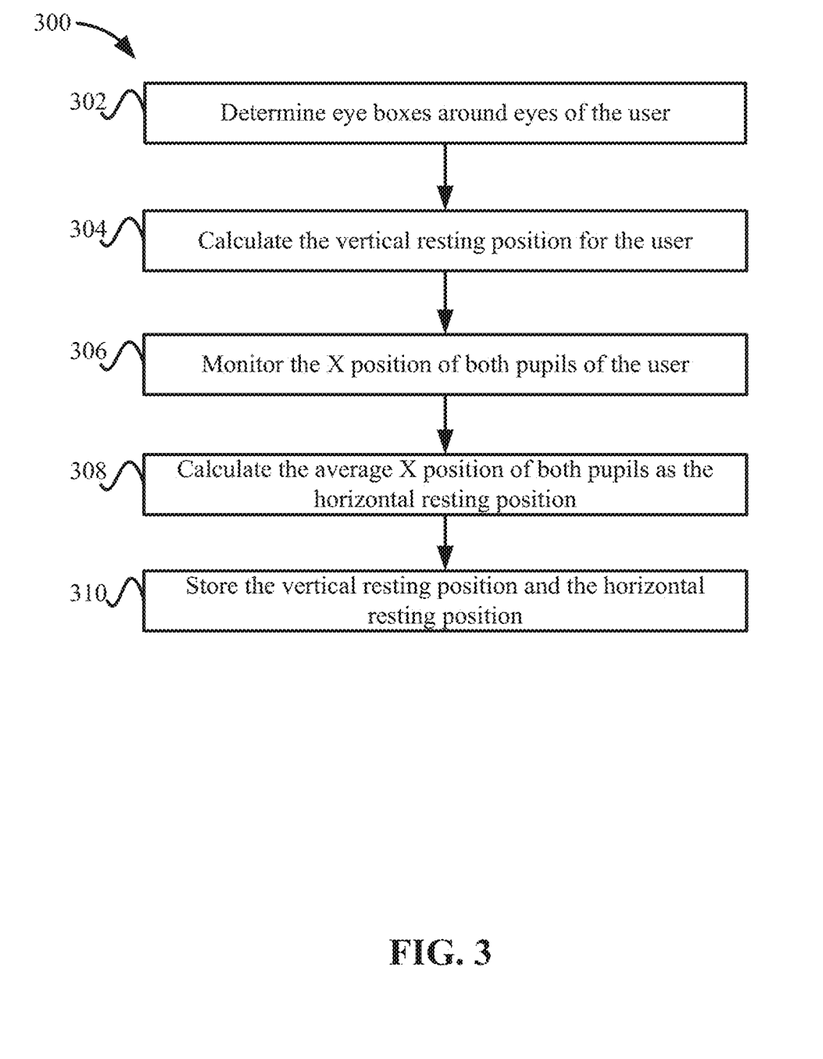
FIG. 3 depicts a simplified flowchart of a method for determining a resting position of the eyes of a user according to some embodiments.

FIG. 3 depicts a simplified flowchart 300 of a method for determining a resting position of the eyes of user 114 according to some embodiments. At 302, controller 112 determines eye boxes around the eyes of user 114. In some embodiments, the eye boxes may be square or rectangular in shape and surround the eyes of user 114. In some embodiments, the eye boxes may completely surround at least a portion or all of the eyes with the center of the eye boxes being substantially around the pupils of the user's eyes. For example, controller 112 may detect the pupil of an eye, and then draw a pre-defined size of a box around the pupil with the pupil as the center of the box.

At 304, controller 112 calculates the vertical resting position for user 114. The vertical resting position may take a ratio of the vertical position of the eye boxes as the vertical resting position. For example, a position that is 60% from the top position of the eye box may be used as the vertical resting position. The vertical resting position may be a measurement within the frame of video, such as a Y coordinate. Other methods may also be used to determine the vertical resting position. For example, controller 112 may detect the pupil position within the eye boxes and determine the average vertical position of the pupils as the vertical resting position.

Controller 112 may also use different methods for calculating the horizontal resting position. For example, at 306, controller 112 monitors the X position of both pupils of the user. The X position may be based on measurements within the image of video, such as an X coordinate within the image. For example, while the user is at rest, controller 112 measures the X position of both of the pupils. Then, at 308, controller 112 calculates the average X position of both pupils as the horizontal resting position. For example, controller 112 may monitor the X position for a certain amount of time, such as ten seconds, or frames, such as ten frames, while the user's eyes are at rest. The average X position may result in a position that is in between the two pupils, such as near a center point between the user's eyes. It will be noted, depending on the position of the user's pupils within the eyes, the horizontal resting position may vary with respect to the user's two eyes and eye boxes. Using the average position between the eyes simplifies the calibration of the resting position as the average is usually around the center on the face of the user. Thus, the offset of the active position is calculated as the distance off the face's vertical center line based on the resting position. This eliminates having to calculate two measurements for two eyes separately and compare each of those measurements to a different threshold.

At 310, controller 112 stores the vertical resting position and the horizontal resting position. For example, the horizontal resting position and the vertical resting position may form an X-Y coordinate within the frame of video, which will be used later when eye gestures are determined.

Figure 4:
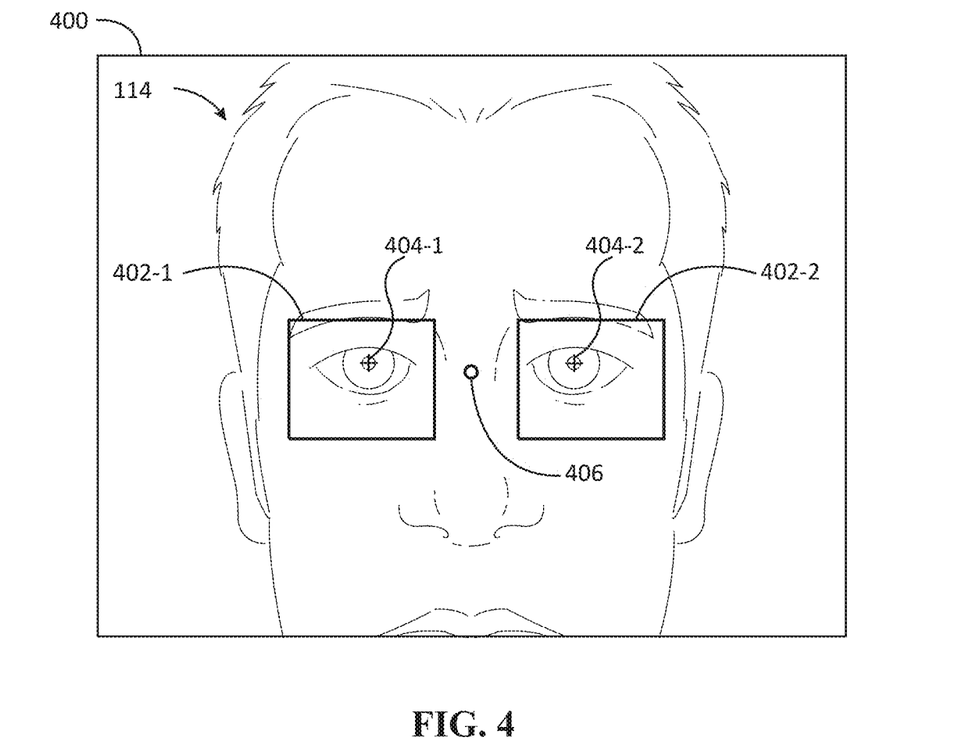
FIG. 4 depicts an example of eye boxes according to some embodiments.

FIG. 4 depicts an example of eye boxes 402 according to some embodiments. A first eye box 402-1 is formed around a first eye of user 114 and a second eye box 402-2 is formed around a second eye of user 114. Eye boxes 402 may have a center point around the pupils of user 114. For example, controller 112 has detected a first pupil 404-1 and a second pupil 404-2 and those form the center points for eye boxes 402-1 and 402-2, respectively.

Controller 112 may compute the resting position from the horizontal resting position and the vertical resting position. For example, controller 112 takes the X position of the horizontal resting position and the Y position of the vertical resting position to form the resting position at 406. As discussed above, the vertical resting position may be based on a ratio from the top (or bottom) of the eye boxes 402. Also, the horizontal resting position may be based on an average X position of pupils 404-1 and 404-2. For example, if the X positions of the eyes are −3 and +5, the average is (−3+5)/2=2/2=1.

Gesture Calculation

Figure 5:
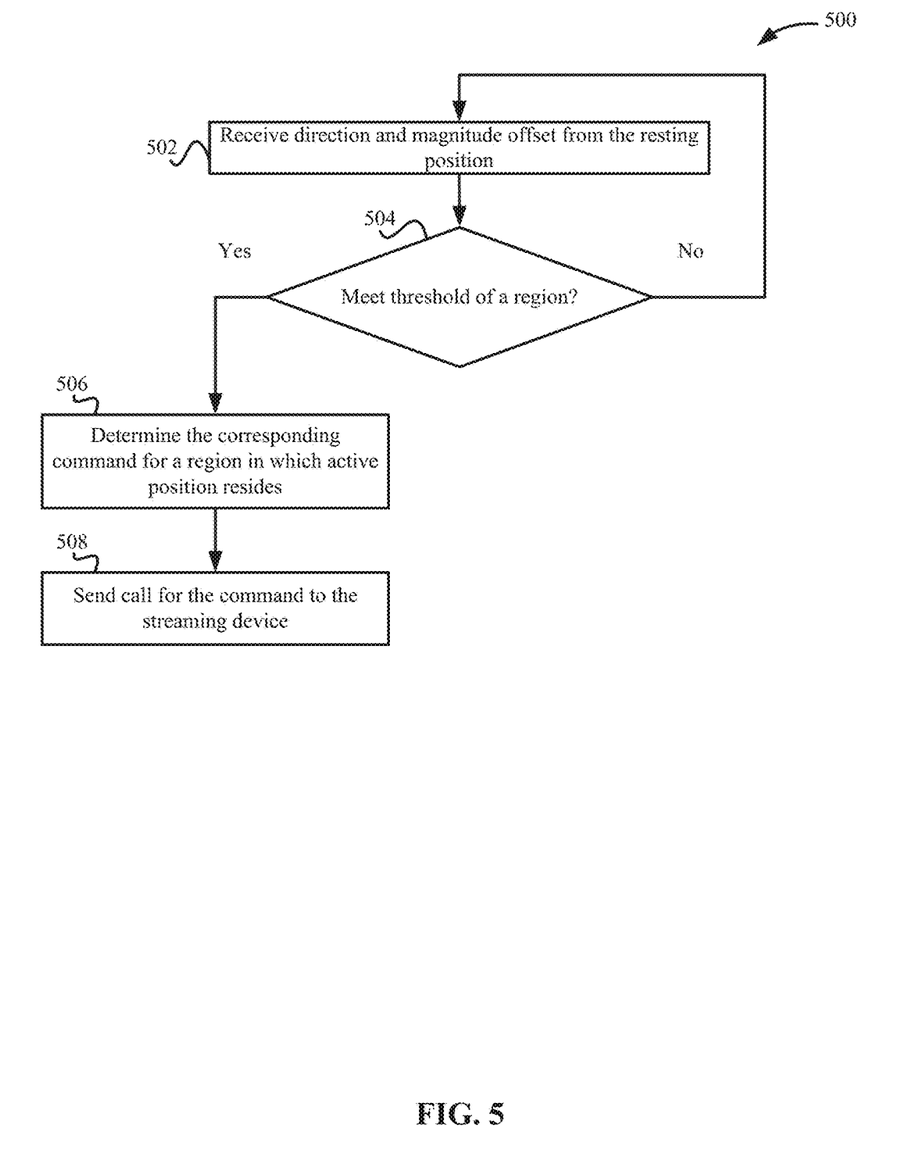
FIG. 5 depicts a simplified flowchart of a method for mapping eye gestures to commands according to some embodiments.
Figure 6:
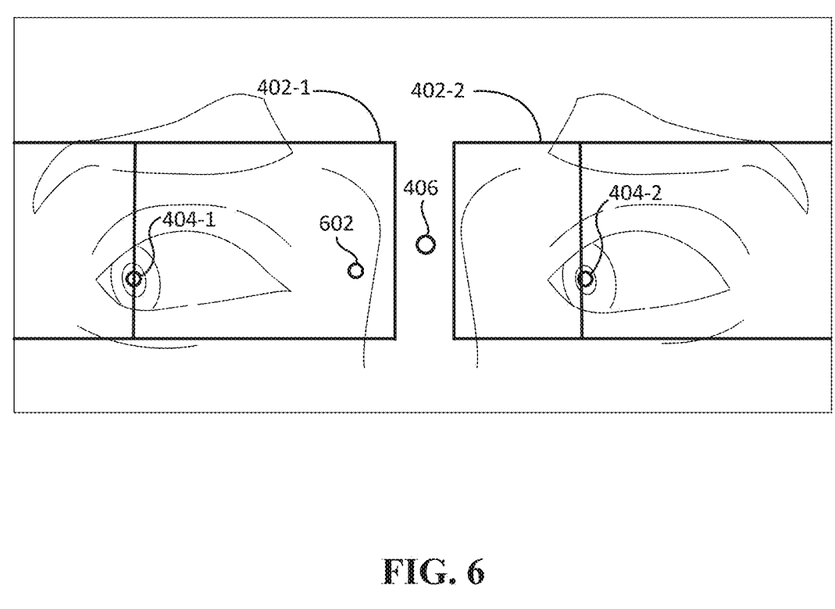
FIG. 6 depicts an example of an active position according to some embodiments.

After determining the resting position of the user, controller 112 can determine when eye gestures are performed by user 114. FIG. 5 depicts a simplified flowchart 500 of a method for mapping eye gestures to commands according to some embodiments. At 502, controller 112 receives a direction and a magnitude offset from the resting position. The direction may be in an X-Y plane and the magnitude is a difference from the active position of user 114 and the resting position. The X resting position is considered the center line of the face and the X offset is the average of the two pupils relative to the center line. For example, controller 112 may continue to receive images from camera 110 and analyze those images. Then, controller 112 may generate eye boxes around the eyes of user 114 and determine an active position of the user's eyes. For example, FIG. 6 depicts an example of the active position 602 according to some embodiments. As shown, eye boxes 402-1 and 402-2 have been drawn around the eyes of user 114 using pupils 404-1 and 404-2 as the center point for respective eye boxes 402-1 and 402-2. The vertical lines through pupils 404-1 and 404-2 illustrate the X positions of the pupils within eye boxes 402-1 and 402-2, respectively Controller 112 then determines an average position of pupils 404-1 and 404-2 in the X and Y directions as active position 602 within the frame of video. For example, active position 602 is a combination of the X average position and the Y average position of pupils 404-1 and 404-2. As can be seen, active position 602 is offset from resting position 406. Controller 112 may generate the offset as a direction and a magnitude, such as a vector. In other embodiments, the X and Y position of active position 602 may be subtracted from resting position 406, or other methods of quantifying the position of active position 602 with respect to resting position 406 may be used.

Referring back to FIG. 5, at 504, controller 112 determines if the direction and the magnitude offset is within a threshold of a region. For example, the user may have to move the user's eyes a certain amount to form a gesture.

Figure 7:
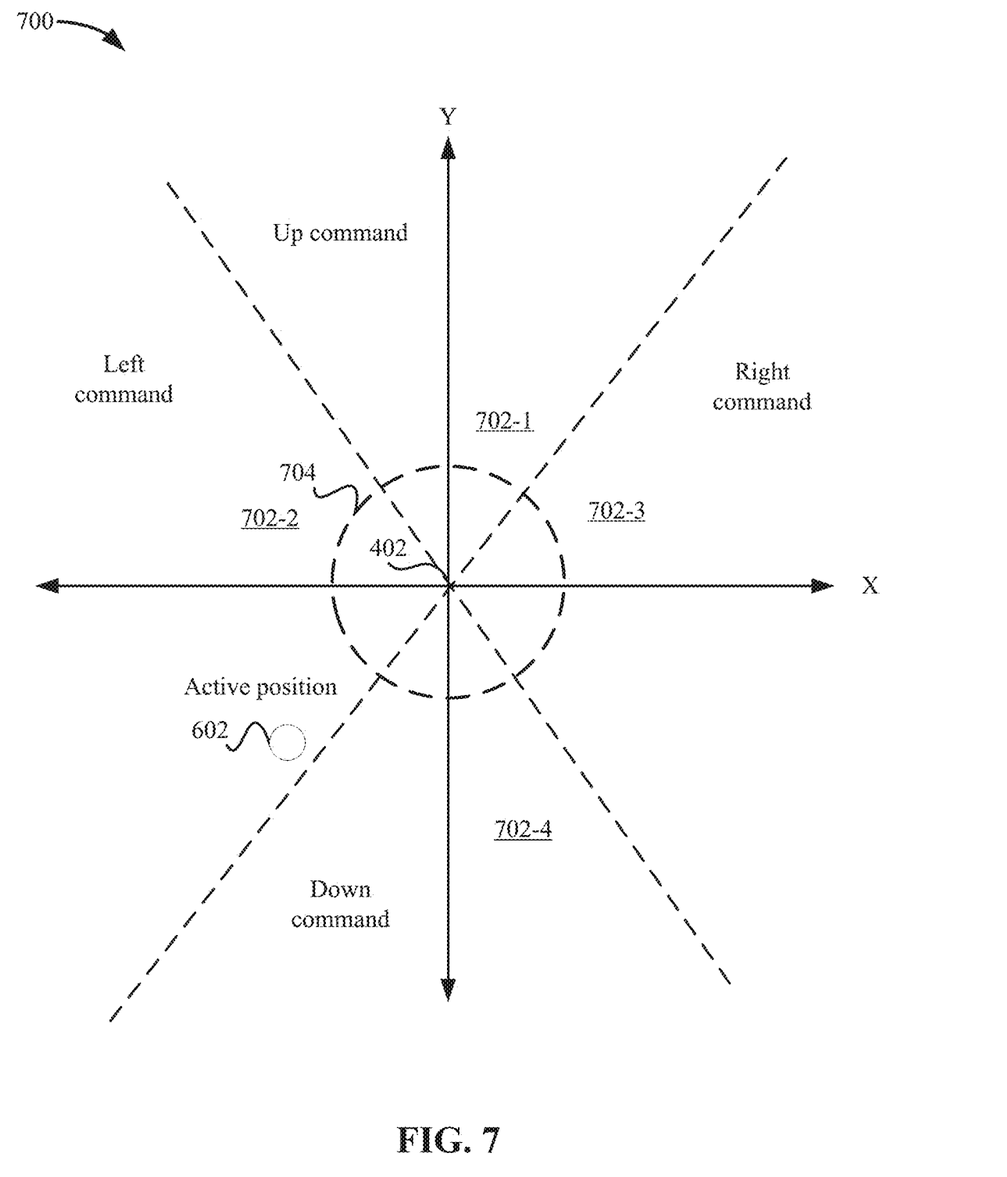
FIG. 7 depicts an example of thresholds that could be applied according to some embodiments.

FIG. 7 depicts an example of thresholds that could be applied according to some embodiments. A graph 700 includes an X axis and a Y axis that maps coordinates for active position 602. The center of graph 700 is the calculated resting position 402. Controller 112 may calculate a threshold 704 around resting position 402. For example, threshold 704 may be a circle, but other shapes may be used. The circle may be formed where a pre-defined radius is used to generate the circle around resting position 402. Threshold 704 is used to ensure that small gazes of the user do not trigger a gesture. That is, the user must move the user's eyes in a direction that is outside of threshold 704 to trigger an eye gesture command.

Graph 700 includes different regions 702-1, 702-2, 702-3, and 702-4 that can be mapped to different gestures. For example, region 702-1 corresponds to an "Up command", region 702-2 corresponds to an "Left command", region 702-3 corresponds to an "Right command", and region 702-4 corresponds to a "Down command". Although four regions 702 are described, more regions may be provided. Regions 702 may be normalized to be resolution independent. That is, different resolutions may not affect the active position offset relative to the eye boxes and resting position.

When active position 602 goes outside of threshold 704, controller 112 determines a region 702 in which active position 602 resides. In the example in FIG. 7, an active position 602 is within region 702-2 and outside of threshold 704. In some embodiments, controller 112 determines the associated command for region 702-2, which is a left command. In some embodiments, controller 112 compares the direction and the magnitude of active position 602 and determines if the direction and the magnitude is outside threshold 704. Then, controller 112 determines which region 702 active position 602 is within and a corresponding command for that region 702.

Referring back to FIG. 5, if the threshold of a region is not met, the process reiterates to 502 to continue to monitor the direction and the magnitude of a user's pupils. However, if a threshold of a region 702 is met, then at 506, controller 110 determines the corresponding command for a region 702 in which active position 602 resides. Then, at 608, controller 112 sends a call for the command to streaming device 116.

Operational gestures that may not map directly to directions, such as regions 702, may use other gestures. For example, time-based blinking may be used to form other gestures. When the user opens and closes his/her eyes, controller 112 may monitor the time the eyes are closed. Controller 112 may detect when the eyes are closed based on different methods, such as detecting when the pupils of the user's eyes are not shown. Then, controller 112 may compare the time to one or more thresholds to determine if the time corresponds to an operational gesture. For example, if the eyes were closed greater than one second, but less than three seconds, controller 112 maps the eye gesture to an okay selection on a remote control. If the eyes were closed for greater than three seconds to five seconds, controller 112 maps the eye gesture to a back selection in the remote control. When a user blinks for five+seconds, then controller 112 may map the eye gesture to the home button.

Controller 112 may also use additional tolerances to prevent processing unintended gestures. Controller 112 may use one mechanism that requires both pupils to be in the directional region to be processed. For example, both pupils should be pointing upwards for the up command to be determined. Also, if a pupil is not detected, then a command may not be performed. This may be because using the average of both pupils will introduce errors when a pupil is not detected.

Also, controller 112 may limit the number of gestures to some maximum, such as one gesture per second. The limit may prevent generating events from noise introduced from the pupil tracking. For example, if a user is blinking or is rolling their eyes a lot, controller 112 may not generate multiple commands from the rolling of the eyes. Or, controller 112 may only generate one command from the rolling of the eyes.

CONCLUSION

Accordingly, eye gestures may be used to determine commands. Using eye gestures allows a user to effectively perform the commands without having to control their gaze in a finely-tuned manner. That is, if a user wants to perform an up command, the user can perform an eye gesture with their eyes in the up direction. This is different from moving their eyes in an upward direction to reach an up selection button being displayed on user interface 108. The gestures may thus be more efficient and easier for a user. Accordingly, users can use eye gestures to control streaming device 116, and perform actions on an application displayed on user interface 108. This provides more flexibility for a user to interact with user interface. Also, users that may not be able to use other input and can now use eye gestures to control user interface 108.

EXAMPLE EMBODIMENTS

In some embodiments, a method comprising: receiving, by a computing device, images of eyes of a user; computing, by the computing device, a vertical resting position of the eyes; computing, by the computing device, a horizontal resting position of the eyes based on an average horizontal position of both of the eyes; receiving, by the computing device, an image of the eyes of the user; calculating, by the computing device, when an offset for a direction and a magnitude of the eyes is within a region in a plurality of regions; determining, by the computing device, a command for the region; and generating, by the computing device, a call for the command to a device to cause the command to be performed on a user interface.

In some embodiments, the method further comprising: computing boxes around the eyes of the user, wherein the boxes are used to compute the vertical resting position and the horizontal resting position.

In some embodiments, the vertical resting position is a vertical position in the boxes.

In some embodiments, the horizontal resting position is the average horizontal position of the eyes in the boxes.

In some embodiments, the direction and the magnitude is an offset from a resting position that is based on the horizontal resting position and the vertical resting position.

In some embodiments, the offset in a horizontal direction is a difference between an average of the horizontal position of the eyes from the image and the horizontal resting position.

In some embodiments, the offset in a vertical direction is a difference between an average of the vertical position of the eyes from the image and the vertical resting position.

In some embodiments, the method further comprising: measuring a time in which the eyes are closed; and mapping the time to another command.

In some embodiments, mapping the time to another command comprises: mapping the time to one of a plurality of commands, wherein each of the plurality of commands is associated with a different range of times in which the eyes are closed.

In some embodiments, the method further comprising: determining whether both eyes are looking in a direction towards the region; when both eyes are looking in the direction towards the region, generating the call for the command; and when both eyes are not looking in the direction towards the region, not generating the call for the command.

In some embodiments, the offset is determined based on an X position offset and a Y position offset of the eyes with the resting position as a center point.

In some embodiments, calculating when the offset for the direction and the magnitude of the eyes is within the region comprises: determining when the direction and the magnitude of the eyes is outside of a threshold and within the region.

In some embodiments, the call comprises a call to an application programming interface of the device.

In some embodiments, a non-transitory computer-readable storage medium containing instructions, that when executed, control a computer system to be operable for: receiving images of eyes of a user; computing a vertical resting position of the eyes; computing a horizontal resting position of the eyes based on an average horizontal position of both of the eyes; receiving an image of the eyes of the user; calculating when an offset for a direction and a magnitude of the eyes is within a region in a plurality of regions; determining a command for the region; and generating a call for the command to a device to cause the command to be performed on a user interface.

In some embodiments, the method further comprising: computing boxes around the eyes of the user, wherein the boxes are used to compute the vertical resting position and the horizontal resting position.

In some embodiments, the direction and the magnitude is an offset from a resting position that is based on the horizontal resting position and the vertical resting position.

In some embodiments, the offset in a horizontal direction is a difference between an average of the horizontal position of the eyes from the image and the horizontal resting position.

In some embodiments, the offset in a vertical direction is a difference between an average of the vertical position of the eyes from the image and the vertical resting position.

In some embodiments, the method further comprising: measuring a time in which the eyes are closed; and mapping the time to another command.

In some embodiments, an apparatus comprising: one or more computer processors; and a non-transitory computer-readable storage medium comprising instructions, that when executed, control the one or more computer processors to be operable for: receiving images of eyes of a user; computing a vertical resting position of the eyes; computing a horizontal resting position of the eyes based on an average horizontal position of both of the eyes; receiving an image of the eyes of the user; calculating when an offset for a direction and a magnitude of the eyes is within a region in a plurality of regions; determining a command for the region; and generating a call for the command to a device to cause the command to be performed on a user interface.

System

Figure 8:
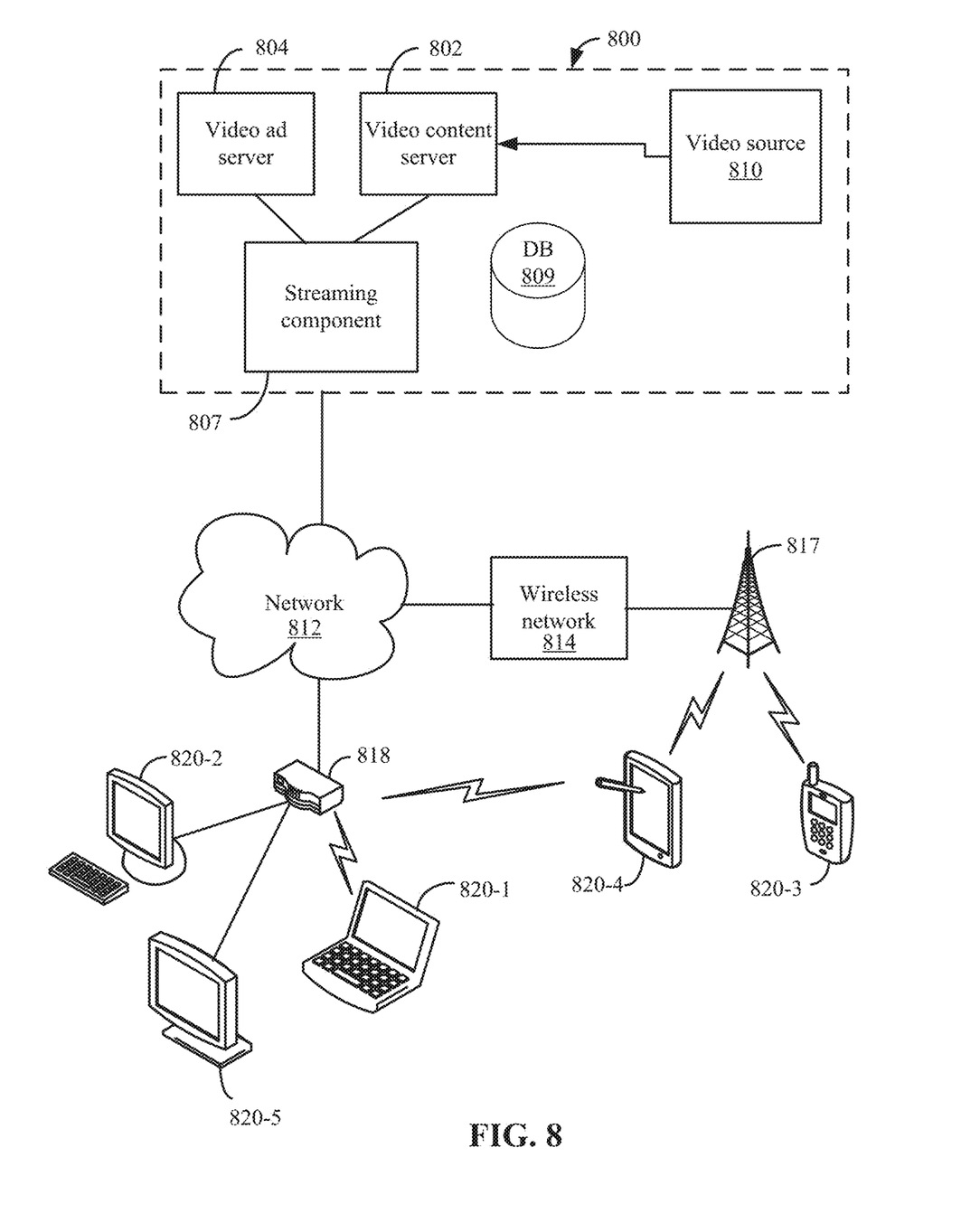
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 800, a public service message, or some other information. The video advertising server 804 may serve the video advertising segments as directed by a user interface controller (not shown).

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example, administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more client devices 820 may be in communication with the video streaming system 800, via the data communication network 812, wireless cellular telecommunications network 814, and/or another network. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 817 for a wireless cellular telecommunications network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HTTP and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
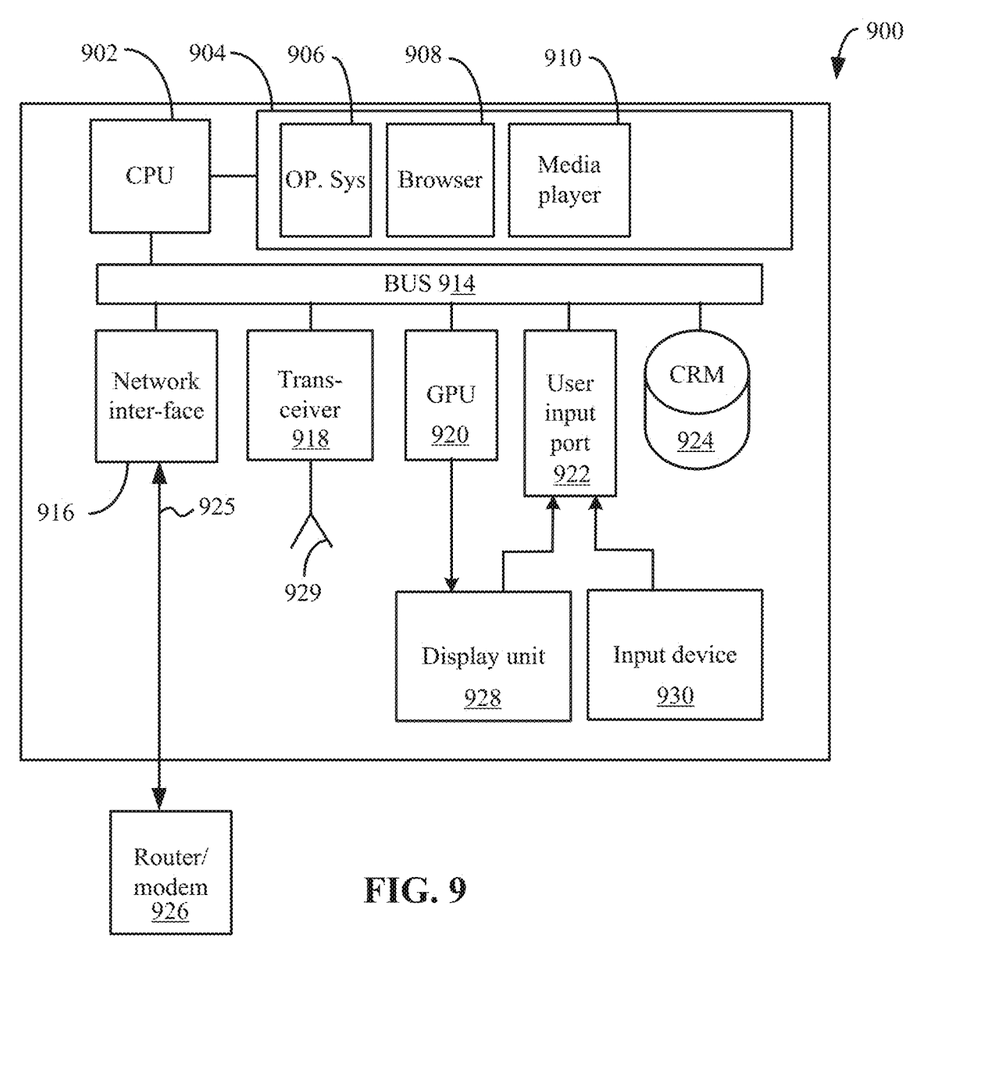
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured or operable to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device (CRM) 924 may store the modules 906, 908, 910 and 912 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured or operable to perform one or more operations of a method as described herein.

A communication interface 916 may also be connected to the bus 914. The communication interface 916 may provide or support two-way data communication between the apparatus 900 and one or more external devices, e.g., the streaming system 800, optionally via a router/modem 926 and a wired or wireless connection. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a computing device, images of eyes of a user;
   computing, by the computing device, a vertical resting position of the eyes;
   computing, by the computing device, a horizontal resting position of the eyes based on an average horizontal position of both of the eyes;
   receiving, by the computing device, an image of the eyes of the user;
   calculating, by the computing device, when an offset for a direction and a magnitude of the eyes is within a region in a plurality of regions;
   determining, by the computing device, a command for the region; and
   generating, by the computing device, a call for the command to a device to cause the command to be performed on a user interface.

2. The method of claim 1, further comprising:
   computing boxes around the eyes of the user, wherein the boxes are used to compute the vertical resting position and the horizontal resting position.

3. The method of claim 2, wherein the vertical resting position is a vertical position in the boxes.

4. The method of claim 2, wherein the horizontal resting position is the average horizontal position of the eyes in the boxes.

5. The method of claim 1, wherein the direction and the magnitude is an offset from a resting position that is based on the horizontal resting position and the vertical resting position.

6. The method of claim 5, wherein the offset in a horizontal direction is a difference between an average of the horizontal position of the eyes from the image and the horizontal resting position.

7. The method of claim 1, wherein the offset in a vertical direction is a difference between an average of the vertical position of the eyes from the image and the vertical resting position.

8. The method of claim 1, further comprising:
   measuring a time in which the eyes are closed; and
   mapping the time to another command.

9. The method of claim 8, wherein mapping the time to another command comprises:
   mapping the time to one of a plurality of commands, wherein each of the plurality of commands is associated with a different range of times in which the eyes are closed.

10. The method of claim 1, further comprising:
    determining whether both eyes are looking in a direction towards the region;
    when both eyes are looking in the direction towards the region, generating the call for the command; and
    when both eyes are not looking in the direction towards the region, not generating the call for the command.

11. The method of claim 1, wherein the offset is determined based on an X position offset and a Y position offset of the eyes with the resting position as a center point.

12. The method of claim 1, wherein calculating when the offset for the direction and the magnitude of the eyes is within the region comprises:
    determining when the direction and the magnitude of the eyes is outside of a threshold and within the region.

13. The method of claim 1, wherein the call comprises a call to an application programming interface of the device.

14. A non-transitory computer-readable storage medium containing instructions, that when executed, control a computer system to be operable for:
    receiving images of eyes of a user;
    computing a vertical resting position of the eyes;
    computing a horizontal resting position of the eyes based on an average horizontal position of both of the eyes;
    receiving an image of the eyes of the user;
    calculating when an offset for a direction and a magnitude of the eyes is within a region in a plurality of regions;
    determining a command for the region; and
    generating a call for the command to a device to cause the command to be performed on a user interface.

15. The non-transitory computer-readable storage medium of claim 14, further comprising:
    computing boxes around the eyes of the user, wherein the boxes are used to compute the vertical resting position and the horizontal resting position.

16. The non-transitory computer-readable storage medium of claim 14, wherein the direction and the magnitude is an offset from a resting position that is based on the horizontal resting position and the vertical resting position.

17. The non-transitory computer-readable storage medium of claim 16, wherein the offset in a horizontal direction is a difference between an average of the horizontal position of the eyes from the image and the horizontal resting position.

18. The non-transitory computer-readable storage medium of claim 14, wherein the offset in a vertical direction is a difference between an average of the vertical position of the eyes from the image and the vertical resting position.

19. The non-transitory computer-readable storage medium of claim 14, further comprising:
   measuring a time in which the eyes are closed; and
   mapping the time to another command.

20. An apparatus comprising:
   one or more computer processors; and
   a non-transitory computer-readable storage medium comprising instructions, that when executed, control the one or more computer processors to be operable for:
   receiving images of eyes of a user;
   computing a vertical resting position of the eyes;
   computing a horizontal resting position of the eyes based on an average horizontal position of both of the eyes;
   receiving an image of the eyes of the user;
   calculating when an offset for a direction and a magnitude of the eyes is within a region in a plurality of regions;
   determining a command for the region; and
   generating a call for the command to a device to cause the command to be performed on a user interface.

* * * * *